Figure 1:
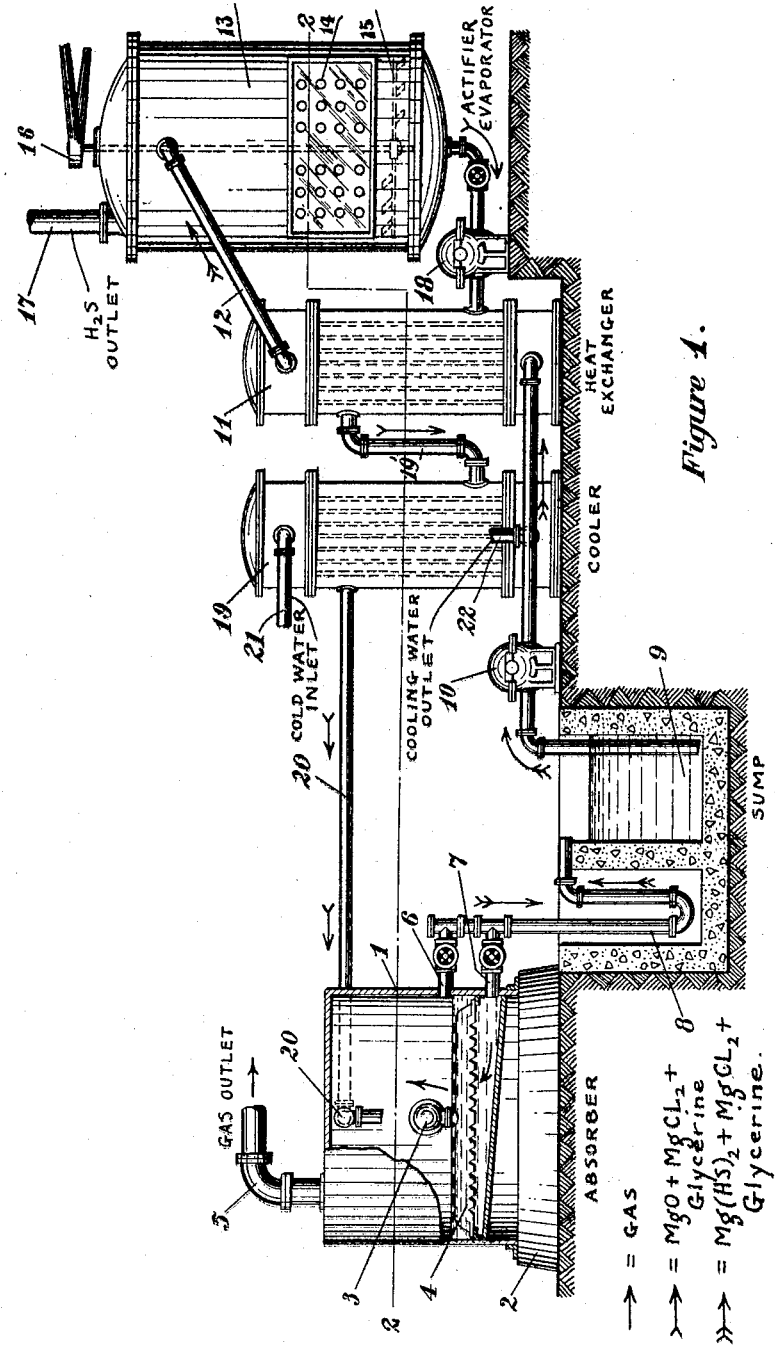

Sept. 22, 1931.  F. W. SPERR, JR  1,824,103
GAS PURIFICATION PROCESS
Filed April 9, 1925  2 Sheets-Sheet 2

INVENTOR
Frederick W. Sperr Jr
BY
Munday Clarke & Carpenter
his ATTORNEYS

Patented Sept. 22, 1931

1,824,103

UNITED STATES PATENT OFFICE

FREDERICK W. SPERR, JR., OF PITTSBURGH, PENNSYLVANIA, ASSIGNOR TO THE KOPPERS COMPANY, OF PITTSBURGH, PENNSYLVANIA, A CORPORATION OF PENNSYLVANIA

GAS PURIFICATION PROCESS

Application filed April 9, 1925. Serial No. 21,931.

This invention relates to the removal of hydrogen sulphide and other acidic gaseous constituents from gases containing them, employing an alkaline absorbent liquid which is revivified by heating or aeration.

The invention relates more particularly to the purification of manufactured gases, such as coke oven gas, water gas, and the like, from hydrogen sulphide or other acidic gaseous constituents contained by said gases. In the specification of the assignee's prior application Ser. No. 520,810, filed Dec. 8, 1921, Patent No. 1,580,452, and Patents Nos. 1,523,845 and 1,523,872 there are described and claimed processes of the above kind in which the gas, previously treated for removal of ammonia, is washed with a suspension of an alkali earth metal compound, for example of magnesium oxide with or without an alkali metal carbonate or hydroxide in solution, and in which the spent purifying liquid is revivified either by heating or aeration.

The primary objects of the present invention are to provide a simple and efficient method of actifying the spent purifying liquid after contact with the impurity laden gas, for further use, and to simplify and cheapen the apparatus necessary for the said purification.

The present invention consists in a process of the above kind characterized by adding to the alkaline absorbent liquid a metallic chloride to facilitate the expulsion of the acidic gaseous constituents from the spent liquid.

The invention also provides apparatus for carrying out this process comprising an absorber, an actifier and a system for circulating purifying liquid to and fro between the absorber and the actifier, characterized by the actifier containing devices for simultaneously agitating and heating or aerating the spent liquid.

A further object of the invention is to increase the efficiency of the revivification stage so that the same may furnish a revivified suspension whereof the activity more nearly approaches that of a freshly prepared suspension than has heretofore been found feasible. In respect to this object, the invention consists in adding a peptizing or anti-coagulating agent, for example glycerine, to the suspension, to prevent coagulation of the particles in suspension in the liquid.

The invention further consists in such other new and useful improvements, and has for further objects such other operative advantages or results as may be found to obtain in the processes and apparatus hereinafter described or claimed.

Figure 2:
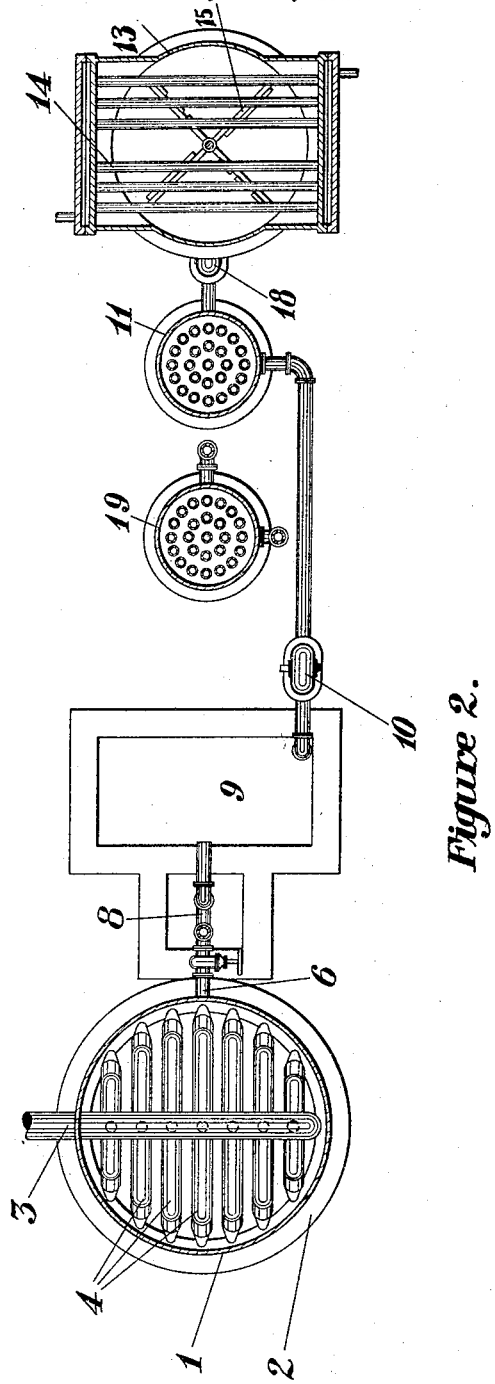

In the accompanying drawings, forming a part of this specification, and showing, for purposes of exemplification, a preferred form and manner in which the invention may be embodied and practiced, but without limiting the claimed invention to such illustrative instance:

Figure 1 is an elevation of apparatus for carrying out the improved process of the present invention, and Figure 2 is a plan view of the same apparatus with the towers shown in section, on line 2—2 of Fig. 1.

In order that the invention may be clearly understood, there will now be described a method of operating a purification process in accordance with the present invention, and in the apparatus illustrated. The treatment of the gas takes place within a scrubbing tower, which may take the form illustrated, wherein it is constituted of a surrounding vertical shell 1, mounted upon a foundation 2, and provided with various inlets and outlets as will be described or noted later. The gas enters the tower through an inlet manifold 3, and is thereby distributed to bells 4. The gas escapes under the serrated edges of the bells 4 into the liquid purifying medium, where it is stripped of its hydrogen sulphide constituents, and a purification thereof is thereby effected. The purified gas escapes at the surface of the liquid, and is removed from the tower through an outlet pipe 5 for whatever use is desired for it. The scrubber tower 1, which is not per se a feature of the invention, may take any desired form suitable to the carrying out of the absorption phase; for example, a tower in which a number of bells, or trays of bells, are arranged in series, might be used, or a tower filled with packing, such as rings of ceramic material, steel turnings, coke, wooden hurdles, and the like, or a centrifugal washer of the Feld type, or the gas might be allowed to diffuse in finely divided form into the liquid through some sort of porous medium, such as cloth, Filtros, earthenware, or other porous substance, as described in the assignee's copending prior applications Ser. No. 718,253, filed June 6, 1924, Patent No. 1,578,560, and Ser. No. 730,676, filed Aug. 7, 1924, Patent No. 1,656,881.

The liquid, after contact with the gas, passes out of the tower through outlets 6 and 7, through a seal 8, and into a spent liquor sump 9, which may if desired be provided with means for agitation. The spent liquor is then pumped from the sump 9 by means of a pump 10 into a heat exchanger 11, where it is heated by indirect contact with hot liquid and discharges through a line 12 into an actifier-evaporator 13. The latter may be equipped with means for heating, such as steam tubes 14, and also with an agitator 15, driven by means of a pulley 16, and further with inlet and outlet pipes as described hereafter. By reason of the heat of the steam tubes, and the action of the agitator, the hydrogen sulphide is driven off from the spent liquid, and escapes through an exit pipe 17 to be disposed of as desired. If it is desired, the vapors escaping through the exit pipe 17 may be passed through some form of indirect contact apparatus, whereby the heat of the same may be applied to preheat the liquid entering the evaporator. It has been found that the actification of the spent liquid is especially facile when that liquid is agitated during the heating process; experimental results have shown that but half the evaporation is required for actification when agitated as when the liquid is heated quietly.

Actification of the liquid having been thus accomplished, the active suspension is pumped from the evaporator 13 by means of a pump 18, through the heat exchanger 11, where it gives up a part of its heat to the spent liquid about to enter the evaporator. The revivified liquid then passes by way of a pipe 19' into a cooler 19, where it is cooled to the proper temperature for absorption by indirect contact with cold water, and into the scrubber tower 1, through an inlet pipe 20. The cold water enters the cooler by an inlet 21 and leaves it by a discharge pipe 22.

The actifier, which in this instance is shown to be constituted in a fashion similar to the ordinary evaporator, may be so arranged as to permit the introduction of steam directly into the suspension, and might take the form of a steam still equipped with a plurality of bell trays, or any other form suitable to the carrying out of the actification phase as described above.

An alternate method of accomplishing the actification of the spent liquid consists in subjecting the same to aeration or to a combination of heating and aeration and suitable apparatus may be provided for either of these purposes.

The preferred absorbing liquid is a suspension of magnesium oxide in water and when the acidic gaseous constitutents such as hydrogen sulphide come into intimate contact with this suspension, the hydrogen sulphide is absorbed from the gases, and remains in the liquid, in the form of compounds with magnesium. It has been found, according to the present invention, that the presence of a metallic chloride, for example magnesium chloride, greatly facilitates the removal of hydrogen sulphide from the suspension, with consequent revivification of the suspension, when the liquid, after contact with the gas to be purified, is heated for this purpose. Consequently, the present invention provides a liquid purifying medium consisting preferably of a suspension of magnesium oxide in a solution of magnesium chloride. An example of a solution-suspension which has been used successfully consists of a 2.0 per cent suspenion of magnesium oxide in a 0.5 per cent solution of magnesium chloride. The acceleration of actification, when the spent solution is heated, is probably due to the acidity caused by the hydrolysis of the magnesium chloride. It has been demonstrated that, when the ratio of magnesium chloride to magnesium oxide is unity, only about one-half as much of the solution-suspension need be evaporated, for actification, as when no chloride is present.

The essential reactions that occur in the process are believed to be as follows:
In the Gas Absorption Stage:

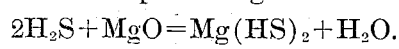
$$2H_2S + MgO = Mg(HS)_2 + H_2O.$$

Upon heating in the actification stage the reverse reaction occurs:

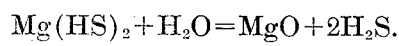
$$Mg(HS)_2 + H_2O = MgO + 2H_2S.$$

The expulsion of the $H_2S$ is facilitated by the magnesium chloride reaction:

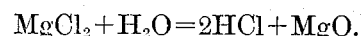
$$MgCl_2 + H_2O = 2HCl + MgO.$$

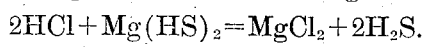
$$2HCl + Mg(HS)_2 = MgCl_2 + 2H_2S.$$

Some magnesium oxy-chloride is probably also formed. Other acidic gaseous constituents such as hydro-cyanic acid are removed by analogous reactions.

The preferred aqueous suspension employed when a peptizing means is used contains 2% of magnesium oxide, 0.5% of magnesium chloride, and glycerine in the proportion of about 1% of the total liquid, as a peptizing means or anticoagulant. This proportion of glycerine is maintained in the suspension.

The addition of the peptizing agent such as glycerine prevents coagulation of the particles in suspension, which is believed to cause the revivified liquid to be less active than a freshly prepared suspension, as is sometimes experienced in carrying out the process without a peptizing agent.

Glycerine employed in the above proportions has been found to give excellent results. Comparative tests in purifying a gas containing approximately 300 grains of hydrogen sulphide per hundred cubic feet employing a solution-suspension of magnesium chloride and magnesium oxide showed, after a given absorption period, that without the presence of a peptizing agent there occurred a loss of efficiency of the revivified liquid relatively to a freshly prepared suspension, which loss was reduced approximately 60% by the addition of glycerine.

The invention as hereinabove set forth or exemplified may be variously practiced or embodied within the scope of the claims hereinafter made.

I claim:

1. In the treatment of gas purification liquor, comprising a suspension of an alkaline earth metal compound adapted to take up acidic gaseous constituents from gas and to be revivified upon revivification of the liquor, to improve its efficiency, the improvement which comprises adding and maintaining a peptizing agent in such liquor to substantially prevent coagulation of the particles during revivification of the liquor.

2. In the treatment of gas purification liquor, comprising a suspension of an alkaline earth metal compound adapted to take up acidic gaseous constituents from gas and to be revivified upon revivification of the liquor, to improve its efficiency, the improvement which comprises adding and maintaining glycerine in such liquor as a peptizing agent to substantially prevent coagulation of the particles during revivification of the liquor.

3. A process of purifying gases comprising washing with an impurity absorbing agent consisting of an aqueous suspension of an alkaline earth metal compound having an affinity for acidic gaseous constituents to remove them from the gas, and revivification by heating of the spent suspension, characterized by maintaining a peptizing or anticoagulating agent in the suspension to prevent coagulation of the particles in suspension.

4. A process as claimed in claim 3, and in which the revivification is effected by heating and aeration.

5. A process of purifying gases comprising washing with an impurity absorbing agent consisting of an aqueous suspension of a magnesium compound and revivification by heating of the spent suspension, characterized by maintaining glycerine in the suspension to prevent coagulation of the particles in the suspension.

6. A process of purifying gases comprising washing with an impurity absorbing agent consisting of an aqueous suspension of a magnesium compound and revivification by heating of the spent suspension, characterized by maintaining glycerine in the suspension in proportion of about 1%, to prevent coagulation of the particles in the suspension.

7. A process of purifying gases which consists in: passing the gas into contact with an alkaline absorbent solution containing an alkali-earth metal compound having an affinity for acidic constituents of the gas, and glycerine, to remove acidic gaseous constituents from the gas; then revivifying the spent liquid.

8. A process of purifying gases which consists in passing the gas into contact with an alkaline absorbent solution containing an alkali-earth metal compound having an affinity for acidic gaseous constituents of the gas, and a peptizing agent, to remove acidic gaseous constituents from the gas, then revivifying the spend liquid.

9. A process of purifying gases which consists in passing the gas into contact with an alkaline absorbent solution containing a magnesium compound having an affinity for acidic gaseous constituents of the gas, adding a peptizing agent to the spent solution, then revivifying such solution.

10. A process of purifying gases which consists in passing the gas into contact with an alkaline absorbent solution containing a magnesium compound having an affinity for acidic gaseous constituents of the gas and glycerine, then revivifying the spent liquid.

11. A process of purifying gases of hydrogen sulphide and other acidic gaseous constituents which consists in passing the gas to be purified into contact with an alkaline absorbent solution containing magnesium chloride, adding glycerine thereto and then revivifying the fouled solution.

12. The process of purifying gases which consists in passing the gas into contact with an alkaline absorbent solution containing magnesium chloride to absorb the impurities from the gas, adding glycerine to the spent solution, then heating the spent solution and agitating it to regenerate it.

13. The process of purifying gases which consists in passing the gas into contact with an alkaline solution containing an alkali-earth metal compound, to remove acidic gaseous constituents from the gas, adding glycerine to the spent solution, then heating and agitating the spent solution containing the glycerine to eliminate absorbed acidic gaseous constitutents and thereby regenerate the solution.

14. A process of purifying gas of hydrogen sulphide which consists in passing the gas to be purified into contact with a solution containing magnesium oxide and magnesium chloride, adding glycerine to the spent solution and then revivifying the solution.

15. A process of purifying gases of hydrogen sulphide and other acidic gaseous constituents comprising: making a suspension of magnesium oxide in a solution of magnesium chloride; passing the gas in contact with said liquid to effect absorption of said impurities by reaction of the magnesium oxide with the impurities of said gas; drawing off the liquid fouled by reaction of said magnesium oxide with the impurities of said gas; revivifying said foul liquid by decomposing the impurity containing magnesium compound under the influence of heat and reaction promoted by the magnesium chloride, so as to restore the suspension of magnesium oxide in a solution of magnesium chloride; employing such revivified suspension-solution for further gas purification, and continuing the cycle, and replenishing losses in the system by adding thereto both magnesium oxide and magnesium chloride to maintain in circulation the required proportion of both.

16. A process of purifying gases of hydrogen sulphide and other acidic gaseous constituents comprising: making a 0.5% solution of magnesium chloride containing approximately 2% of magnesium oxide in suspension; passing the gas in contact with said liquid to effect absorption of said impurities by reaction of the magnesium oxide with the impurities of said gas; drawing off the liquid fouled by reaction of said magnesium oxide with the impurities of said gas; revivifying said foul liquid by decomposing the impurity containing magnesium compound under the influence of heat and reaction promoted by the magnesium chloride, so as to restore the suspension of magnesium oxide in a solution of magnesium chloride; employing such revivified suspension-solution for further gas purification and continuing the cycle and replenishing losses in the system by adding thereto both magnesium oxide and magnesium chloride to maintain in circulation the required proportions of both.

17. A process of purifying gases of hydrogen sulphide and other acidic gaseous constituents comprising: making a suspension of an alkali-earth metal compound in a solution of chloride of the same alkali-earth metal; passing the gas in contact with said liquid to effect absorption of said impurities by reaction of the alkali-earth metal compound with the impurities of the gas; drawing off the liquid fouled by reaction of said alkali-earth metal compound with the impurities of the gas; revivifying said foul liquid by decomposing the impurity containing alkali-earth metal compound under the influence of heat and reaction promoted by the alkali-earth metal chloride, so as to restore the suspension of alkali-earth metal compound in a solution of alkali-earth metal chloride, employing such revivified suspension-solution for further gas purification, and continuing the cycle, and replenishing losses in the system by adding thereto both the alkali-earth metal compound and chloride of the same alkali-earth metal to maintain in circulation the required proportions of both.

18. A process of purifying gases which comprises, passing the gas in contact with a liquid containing both an alkali-earth metal oxide and chloride of the same alkali-earth metal, to remove acidic gaseous constituents from the gas, then heating the spent liquid and, simultaneously with such heating, agitating the spent liquid to regenerate it.

In testimony whereof I have hereunto set my hand.

FREDERICK W. SPERR, Jr.